(12) United States Patent
Foster et al.

(10) Patent No.: US 11,945,365 B1
(45) Date of Patent: Apr. 2, 2024

(54) POCKET LIGHT ADAPTER

(71) Applicant: Lund, Inc., Buford, GA (US)

(72) Inventors: Josh Foster, Buford, GA (US); Terrel Lindsay, Buford, GA (US)

(73) Assignee: Lund, Inc., Buford, GA (US)

( * ) Notice: Subject to any disclaimer, the term of this patent is extended or adjusted under 35 U.S.C. 154(b) by 0 days.

(21) Appl. No.: 18/097,107

(22) Filed: Jan. 13, 2023

(51) Int. Cl.
*B60Q 1/26* (2006.01)
*F21S 43/20* (2018.01)
*F21S 45/50* (2018.01)

(52) U.S. Cl.
CPC ......... *B60Q 1/2626* (2013.01); *B60Q 1/2653* (2013.01); *F21S 43/26* (2018.01); *F21S 45/50* (2018.01)

(58) Field of Classification Search
None
See application file for complete search history.

(56) References Cited

U.S. PATENT DOCUMENTS

| 8,948,564 B1* | 2/2015 | Sherman | F21K 9/232 |
|---|---|---|---|
| | | | 362/628 |
| 2017/0038031 A1* | 2/2017 | Chien | F21V 5/00 |

FOREIGN PATENT DOCUMENTS

| CA | 2620144 | * 12/2006 |
|---|---|---|
| CN | 206691134 | * 1/2017 |

\* cited by examiner

*Primary Examiner* — Ashok Patel
(74) *Attorney, Agent, or Firm* — William H. Honaker; Dickinson Wright PLLC

(57) ABSTRACT

A lighting assembly includes one or more spheroid lenses and a lighting insert configured to hold the spheroid lens or lenses and to cover a hole in a vehicle body panel. The lighting insert is further configured to form a water-tight seal with each of the vehicle body panel and the spheroid lens or lenses. The lighting insert defines a lens aperture configured to hold a corresponding spheroid lens. The lens aperture is substantially smaller than the hole in the vehicle body panel, and the lighting insert is further configured to form a water-tight seal with each of the vehicle body panel and the spheroid lens. The lighting insert may define a circle shape that is configured to cover a circle-shaped hole in the vehicle body panel. The lighting insert may define an oval shape that is configured to cover an oval-shaped hole in the vehicle body panel.

15 Claims, 6 Drawing Sheets

POCKET LIGHT ADAPTER

FIELD

The present disclosure relates generally to adapters for mounting a semi-spheroid shaped lens into a larger hole in a surface of a motor vehicle.

BACKGROUND

Several different standard sizes and shapes for lights in motor vehicles exist. For example, several different suppliers produce standard lights, such as marker lights or brake/running lights to fit in round openings having a diameter of 2" or 4". Additionally, many different lights may be available for oval-shaped openings. One common example is stop/turn/tail lights for rear panels on a vehicle, such as a truck or trailer, and which have an oval shape configured to fit in a hole with a width of 6.5 inches to 6.75 inches and a height of about 2.5 inches.

SUMMARY

The present disclosure provides a lighting assembly. The lighting assembly comprises at least one spheroid lens and a lighting insert configured to hold the at least one spheroid lens and to cover a hole in a vehicle body panel. The lighting insert is further configured to form a water-tight seal with each of the vehicle body panel and the at least one spheroid lens.

The present disclosure also provides a lighting insert configured to adapt at least one spheroid lens to a hole in a vehicle body panel. The lighting insert defines a lens aperture configured to hold a corresponding spheroid lens of the at least one spheroid lens. The lens aperture is substantially smaller than the hole in the vehicle body panel, and the lighting insert is further configured to form a water-tight seal with each of the vehicle body panel and the at least one spheroid lens.

BRIEF DESCRIPTION OF THE DRAWINGS

Further details, features and advantages of designs of the invention result from the following description of embodiment examples in reference to the associated drawings.

DETAILED DESCRIPTION

Referring to the drawings, the present invention will be described in detail in view of following embodiments.

The present disclosure provides lighting inserts for holding one or more spheroid lenses, which may also be called watermelon lights, in a larger hole of a vehicle body panel, such as a 2" or a 4" circular hole or a 6.5" oval-shaped hole. The lighting inserts maintain a watertight seal with the vehicle body panel and add a quality, stylish mounting face.

Figure 1:
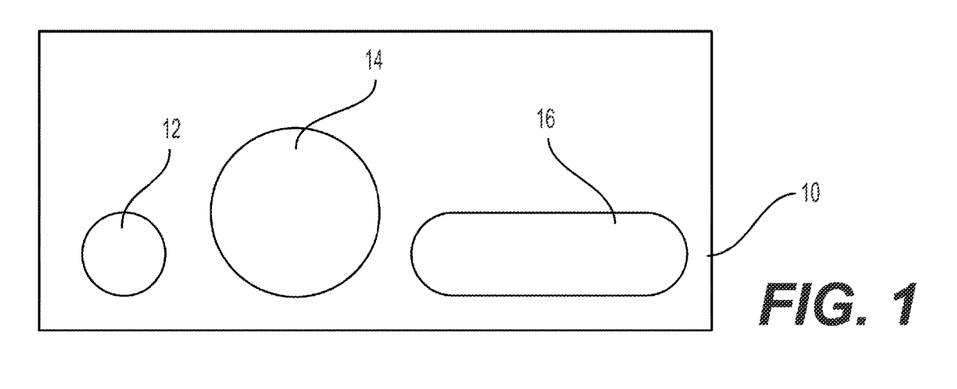
FIG. 1 shows a front sectional view of a vehicle panel with a circular hole and an oval hole for holding a lighting element.

FIG. 1 shows a front sectional view of a vehicle body panel 10 with a first circle-shaped hole 12, a second circle-shaped hole 14 that is larger than the first circle-shaped hole 12 and an oval-shaped hole 16. For example, the first circle-shaped hole 12 may have a diameter of 2", the second circle-shaped hole 14 may have a diameter of 4", and the oval-shaped hole 16 may have a height of 2" and a width of 6.5". Each of the holes 12, 14, 16 may be provided for holding a lighting element, such as a marker light or a stop/turn signal light. Unless otherwise defined, the term "oval" should be understood to include both a true oval with a continuous curvature, and a flattened oval, which may also be called a racetrack shape. Such a flattened oval may include two substantially parallel edges spaced apart from one another and extending between two rounded ends, which may each define a semicircle.

Figure 2A:
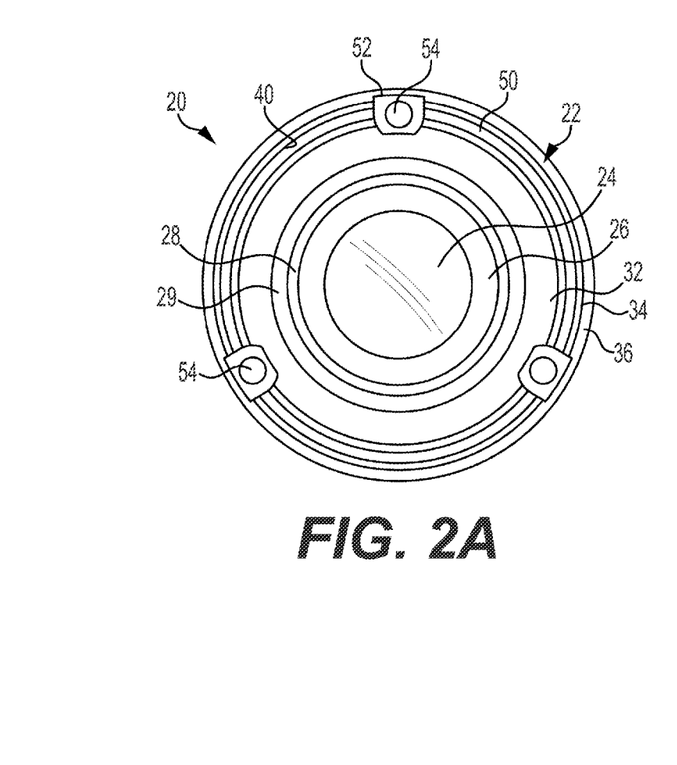
FIG. 2A shows a front view of a first lighting assembly of the present disclosure, including a first circular lighting insert holding a spheroid lens.
Figure 2B:
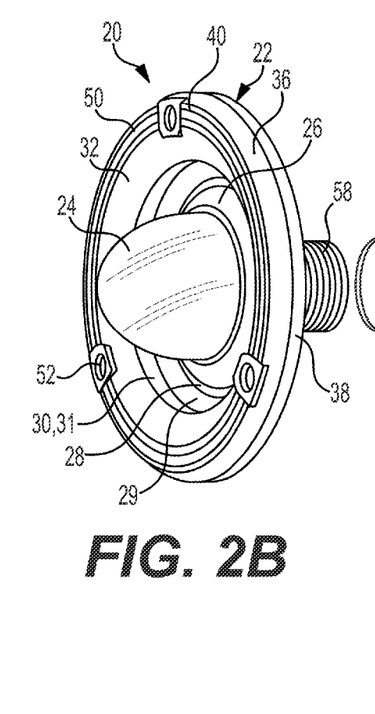
FIG. 2B shows a perspective view of the first lighting assembly of FIG. 2A.

FIGS. 2A-2B show a first lighting assembly 20 including a first circular lighting insert 22, which may also be called a bezel, holding a first spheroid lens 24. The first spheroid lens 24 may be called a mini watermelon light, and may have a diameter of about 0.75". The first circular lighting insert 22 may have a one-piece construction that seals against both the vehicle body panel 10 and the first spheroid lens 24 for providing a water-tight seal therebetween. For example, the first circular lighting insert 22 may be made from a cast material, such as a metal billet.

The first circular lighting insert 22 provides for the first spheroid lens 24, with a first base ring 26 attached thereto, to be mounted in the first circle-shaped hole 12, which has a larger diameter, such as 2.0". The first circular lighting insert 22 provides a water-tight seal between the first spheroid lens 24 and the vehicle body panel 10. As shown in FIGS. 2A-2B, the first circular lighting insert 22 includes a first floor 28 having a ring shape with a flat surface that extends parallel to and spaced apart from the vehicle body panel 10. The first floor 28 defines a lens aperture 56, that is configured to receive the first spheroid lens 24 for attachment to the first circular lighting insert 22. The first circular lighting insert 22 also includes a tubular portion 30 that is configured to fit within the first circle-shaped hole 12. The tubular portion 30 defines a first inner cylindrical surface 31 surrounding the first spheroid lens 24.

The first circular lighting insert 22 also defines a first angled surface 29 having a ring shape that extends annularly around the first floor 28 and axially away therefrom and to the first inner cylindrical surface 31. A second angled surface 32 extends annularly around the first inner cylindrical surface 31, from an end thereof opposite from the first angled surface 29. The second angled surface 32 extends radially outwardly and axially away from the first floor 28 and extends to a first outer surface 34. The first outer surface 34 extends parallel to the first floor 28 and parallel to the vehicle body panel 10 when the first lighting assembly is attached thereto.

The first circular lighting insert 22 is configured to hold the first spheroid lens 24 in an extending position that protrudes beyond the first outer surface 34.

The first circular lighting insert 22 also defines a third angled surface 36 that extends annularly around the first outer surface 34 and which extends axially back toward the vehicle body panel 10 when the first lighting assembly 20 is attached thereto. Thus, the first outer surface 34 defines an outer-most surface of the first lighting assembly 20. The first circular lighting insert 22 also defines a first outer cylindrical surface 38 having a tubular shape that is coaxial with the first inner cylindrical surface 31 of the tubular portion 30, and which extends axially from the third angled surface 36 to a back surface (not shown on the FIGs) for engaging the vehicle body panel 10.

One or more surfaces of the first circular lighting insert 22, such as the first floor 28, the first angled surface 29, the first inner cylindrical surface 31, the second angled surface, the first outer surface 34, the third angled surface 36, and/or the first outer cylindrical surface 38 may have a first surface finish, such as a polished surface and/or a bright metallic coating which may present a bright reflective surface.

In some embodiments, and as shown in FIGS. 2A-2B, the first outer surface 34 defines an annular recess 40 configured to receive a first accent ring 50, which may present a second surface finish that is different than the first surface finish of the first circular lighting insert 22. For example, the first accent ring 50 may have a non-reflective finish, such as a matte finish, which may appear black or another color. The first accent ring 50 further includes a plurality of mounting pads 52, which are inset in corresponding recesses of the first circular lighting insert 22 and which define mounting holes 54 for receiving fasteners (not shown), such as nuts or screws for attaching the first lighting assembly 20 to the vehicle body panel 10. As shown on FIGS. 2A-2B, the first accent ring 50 includes three of the mounting pads 52 spaced apart at regular angular intervals. However, the first accent ring 50 may include a different number of the mounting pads 52. The mounting pads 52 may protrude in a radial direction beyond the first outer surface 34 to overlie the second angled surface 32 and/or the third angled surface 36. In some embodiments, the first accent ring 50 may be made of a resilient material, such as rubber or a soft plastic. Alternatively or additionally, the first accent ring 50 may include a hard material, such as metal or a hard polymer.

In some embodiments, and as shown on FIG. 2B, a mounting base 58 is attached to the first spheroid lens 24 and configured to extend through the lens aperture 56 for attaching the first spheroid lens 24 to the first lighting assembly 20. For example, and as shown on FIG. 2B, the mounting base 58 may define external threads, and a retaining nut 60 may be screwed onto the external threads of the mounting base 58 to hold the first floor 28 of the first circular lighting insert 22 between the first base ring 26 and the retaining nut 60. The mounting base 58 may facilitate attachment to the lens aperture to the first lighting assembly 20 by other means, such as with a clips or catch. In some embodiments, the mounting base 58 may be integrally formed with the first base ring 26.

As also shown on FIG. 2B, the first circular lighting insert 22 is configured to hold first spheroid lens 24 in an extended position that is entirely or substantially entirely outside of the vehicle body panel 10.

Figure 3:
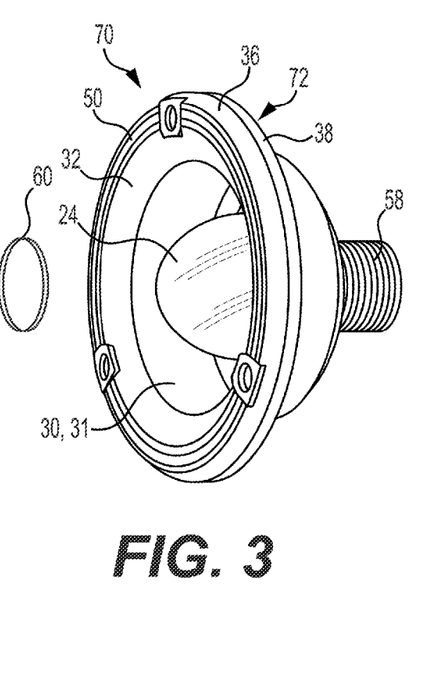
FIG. 3 shows a perspective view of a second lighting assembly that is similar to the first lighting assembly, except with a second circular lighting insert configured to hold the spheroid lens in a recessed position.

FIG. 3 shows a perspective view of a second lighting assembly 70 that is similar to the first lighting assembly 20, except with a second circular lighting insert 72 configured to hold the first spheroid lens 24 in a recessed position. The second circular lighting insert 72 may be similar or identical to the first circular lighting insert 22, except with the tubular portion 30 having a longer axial length to cause the first spheroid lens 24 in a recessed position and not to protrude beyond the first outer surface 34.

Figure 4A:
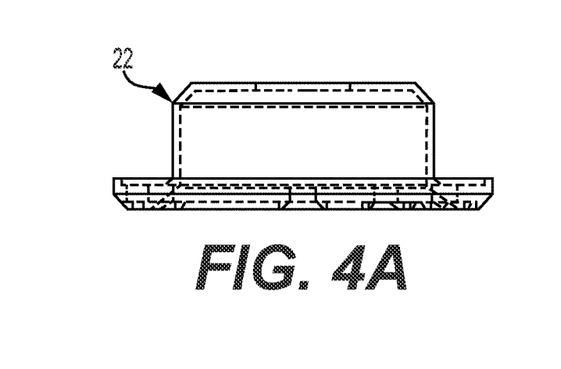
FIG. 4A shows a top view of the first circular lighting insert of the first lighting assembly.
Figure 4B:
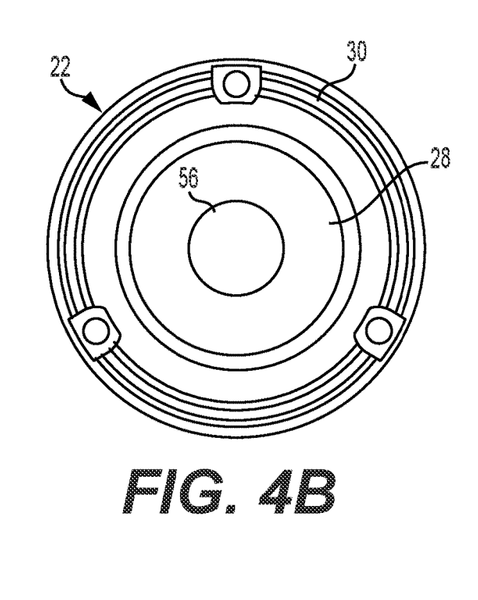
FIG. 4B shows a front view of the first circular lighting insert of FIG. 4A.
Figure 4C:
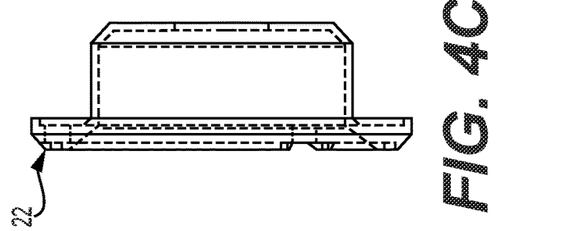
FIG. 4C shows a side view of the first circular lighting insert of FIG. 4A.
Figure 4D:
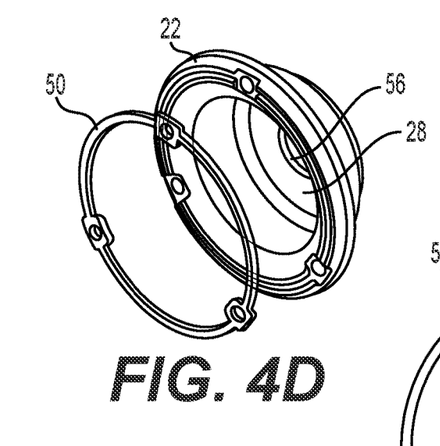
FIG. 4D shows an exploded perspective view of the first circular lighting insert of FIG. 4A with a corresponding accent ring.
Figure 5:
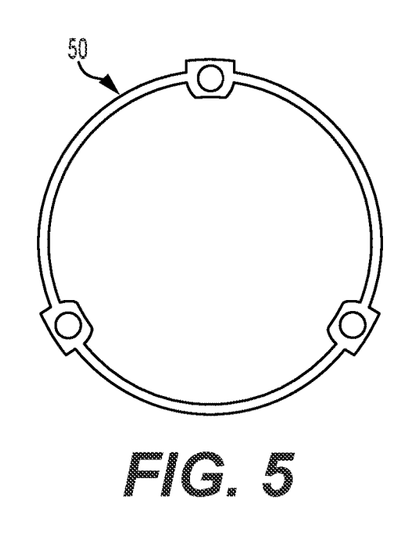
FIG. 5 shows a front view of the accent ring for the first lighting assembly.

FIGS. 4A-4C show various views of the first circular lighting insert 22. FIG. 4D shows an exploded view of the first circular lighting insert 22 with the first accent ring 50, and FIG. 5 shows a front view of the first accent ring 50.

Figures 6A, 6B, 7:
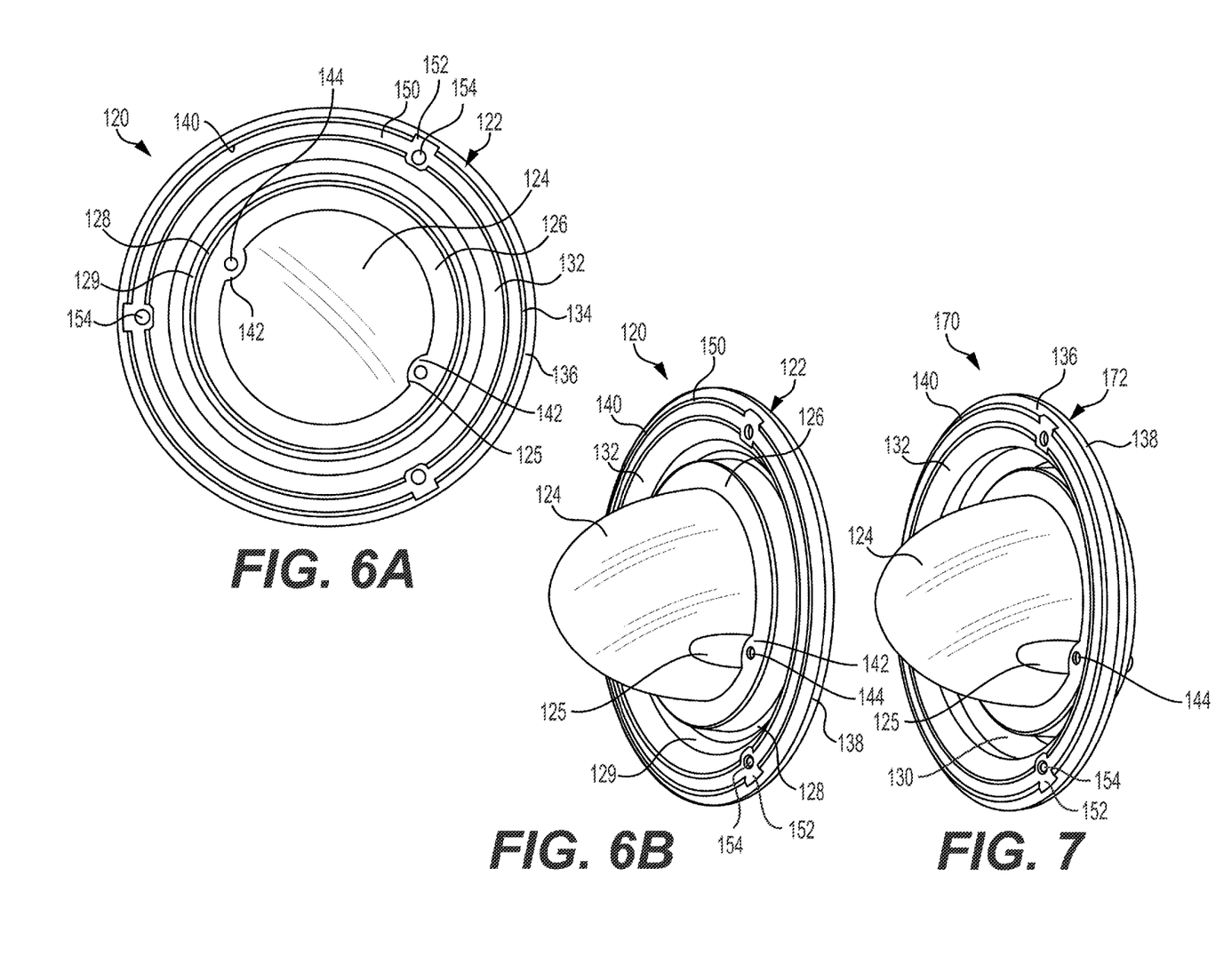
FIG. 6A shows a front view of a third lighting assembly of the present disclosure, including a third circular lighting insert holding a second spheroid lens.
FIG. 6B shows a perspective view of the third lighting assembly of FIG. 6A.
FIG. 7 shows a perspective view of a fourth lighting assembly that is similar to the third lighting assembly, except with the circular lighting insert configured to hold the spheroid lens in a recessed position.

FIG. 6A-6B show a third lighting assembly 120 of the present disclosure, including a third circular lighting insert 122 holding a second spheroid lens 124. The second spheroid lens 124 may be larger than the first spheroid lens 24. For example, the second spheroid lens 124 may have a diameter of about 3.5 inches.

The third circular lighting insert 122 provides for the second spheroid lens 124, with a second base ring 126 attached thereto, to be mounted in the second circle-shaped hole 14, which has a larger diameter, such as 4.0 inches. The third circular lighting insert 122 provides a water-tight seal between the second spheroid lens 124 and the vehicle body panel 10. As shown in FIGS. 6A-6B, the third circular lighting insert 122 includes a second floor 128 having a ring shape with a flat surface that extends parallel to and spaced apart from the vehicle body panel 10. The second floor 128 defines a lens aperture (not shown on the FIGs), configured to receive the second spheroid lens 124 for attachment thereto. The lens aperture may be substantially smaller than the first circle-shaped hole 12 in the vehicle body panel 10. For example, the lens aperture may have a diameter of about 0.75 inches. The third circular lighting insert 122 also defines a fourth angled surface 129 disposed annularly around the second floor 128 and extending axially away therefrom. A fifth angled surface 132 surrounds the second spheroid lens 124 and extends annularly around the fourth angled surface 129 and axially therefrom to a second outer surface 134. The fifth angled surface 132 has a shallower angle than the fourth angled surface 129 to project light outwardly from the second spheroid lens 124 in a direction perpendicular to the vehicle body panel 10. The second outer surface 134 extends parallel to the second floor 128 and parallel to the vehicle body panel 10 when the third lighting assembly 120 is attached thereto.

The third circular lighting insert 122 is configured to hold the second spheroid lens 124 in an extended position that is entirely or substantially entirely outside of the vehicle body panel 10.

The third circular lighting insert 122 also defines a sixth angled surface 136 that extends annularly around the second outer surface 134 and which extends axially back toward the vehicle body panel 10 when the third lighting assembly 120 is attached thereto. Thus, the second outer surface 134 defines an outer-most surface of the third lighting assembly 120. The third circular lighting insert 122 also defines a second outer cylindrical surface 138 having a tubular shape that extends axially from the sixth angled surface 136 to a back surface (not shown on the FIGs) for engaging the vehicle body panel 10.

One or more surfaces of the third circular lighting insert 122, such as the second floor 128, the fourth angled surface 129, the fifth angled surface 132, the second outer surface 134, the sixth angled surface 136, and/or the second outer cylindrical surface 138 may have a bright reflective surface, such as a polished surface and/or a bright metallic coating.

In some embodiments, and as shown in FIGS. 6A-6B, the second outer surface 134 defines a second annular recess 140 configured to receive a second accent ring 150, which may present a different finish appearance such as a dull finish, which may appear black or another color. The second accent ring 150 further includes a plurality of second mounting pads 152, which are inset in corresponding recesses of the third circular lighting insert 122 and which define second mounting holes 154 for receiving fasteners (not shown), such as nuts or screws for attaching the third lighting assembly 120 to the vehicle body panel 10. The second accent ring 150 includes three of the second mounting pads 152 spaced apart at regular angular intervals. However, the second accent ring 150 may include a different number of the second mounting pads 152. The second mounting pads 152 may protrude in a radial direction beyond the second outer surface 134 to overlie the fifth angled surface 132 and/or the sixth angled surface 136. In some embodiments, the second accent ring 150 may be made of a resilient material, such as rubber or a soft plastic. Alternatively or additionally, the second accent ring 150 may include a hard material, such as metal or a hard polymer.

In some embodiments, the second base ring 126 defines one or more tabs 142 that extend radially inwardly to engage corresponding recesses 125 in the second spheroid lens 124. The interaction of the tabs 142 with the corresponding recesses 125 in the second spheroid lens 124 may prevent the second spheroid lens 124 from rotating. Each of the tabs 142 further define a hole 144 for receiving a fastener, such as a screw, bolt, or rivet, for attaching the second spheroid lens 124 to the third circular lighting insert 122. Additionally, the corresponding recesses 125 in the second spheroid lens 124 may provide clearance to allow a tool, such as a screwdriver tip, to access the fastener in the hole 144.

FIG. 7 shows a perspective view of a fourth lighting assembly 170 that is similar to the third lighting assembly 120, except with a fourth circular lighting insert 172 configured to hold the second spheroid lens 124 in a recessed position, with at least part of the second spheroid lens 124 recessed within the first circle-shaped hole 12 in the vehicle body panel 10. The fourth circular lighting insert 172 may be similar or identical to the third circular lighting insert 122, except with a second inner cylindrical surface 130 disposed between the fourth angled surface 129 and the fifth angled surface 132 to provide an axial spacing therebetween, to thereby recess the second floor 128 further back from an outer surface of the vehicle body panel 10.

Figure 8A:
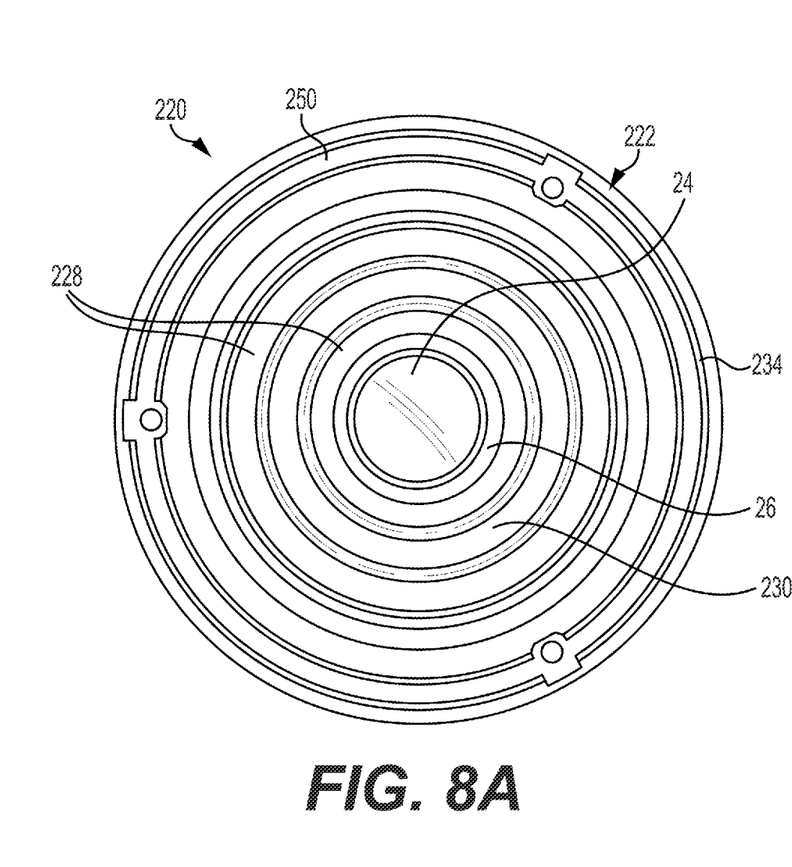
FIG. 8A shows a front view of a fifth lighting assembly of the present disclosure, including a fifth circular lighting insert holding a spheroid lens.
Figure 8B:
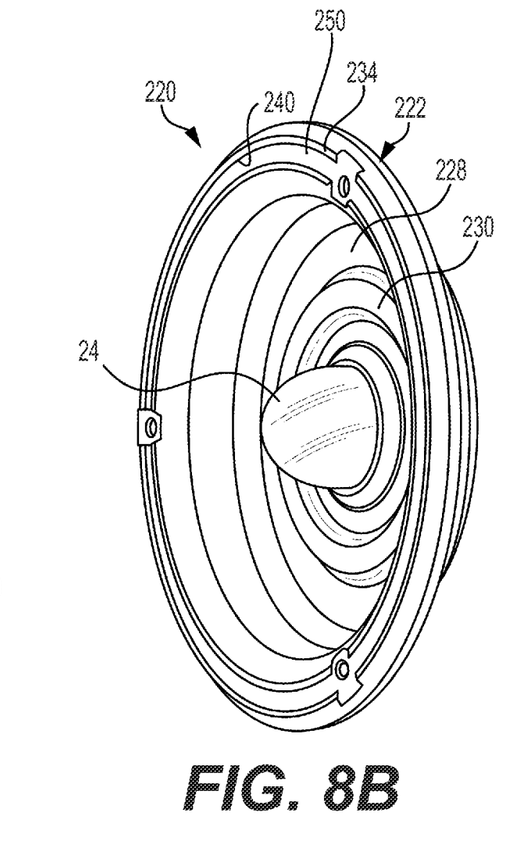
FIG. 8B shows a perspective view of the fifth lighting assembly of FIG. 8A.

FIG. 8A-8B show a fifth lighting assembly 220 including a fifth circular lighting insert 222 holding a first spheroid lens 24. The fifth circular lighting insert 222 may allow a single mini watermelon light having a diameter of about 0.75", to be mounted in the second circle-shaped hole 14, which has much larger diameter, such as 4.0". The fifth circular lighting insert 222 provides a water-tight seal between the first spheroid lens 24 and the vehicle body panel 10. The fifth circular lighting insert 222 may have a one-piece construction that seals against both the vehicle body panel 10 and the first spheroid lens 24 for providing a water-tight seal therebetween. For example, the fifth circular lighting insert 222 may be made from a cast material, such as a metal billet.

As shown in FIGS. 8A-8B, the fifth circular lighting insert 222 includes a fifth floor 228 having a ring shape with a flat surface that extends parallel to and spaced apart from the vehicle body panel 10. The fifth floor 228 defines a lens aperture (not shown on the FIGs), configured to receive the first spheroid lens 24 for attachment thereto. The lens aperture may be substantially smaller than the second circle-shaped hole 14 in the vehicle body panel 10. For example, the lens aperture may have a diameter of about 0.75 inches. The fifth circular lighting insert 222 includes an annular ridge 230 protruding from the fifth floor 228 and surrounding the lens aperture to provide some a dimensional effect and to enhance reflection of light from the first spheroid lens 24. The annular ridge 230 may also provide the fifth circular lighting insert 222 with additional structural rigidity.

The fifth circular lighting insert 222 also defines a third outer surface 234 that extends parallel to the fifth floor 228 and parallel to the vehicle body panel 10 when the fifth lighting assembly 220 is attached thereto. In some embodiments, and as shown in FIGS. 8A-8B, the third outer surface 234 defines a third annular recess 240 configured to receive a third accent ring 250, which may present a different finish appearance such as a dull finish, which may appear black or another color. The third accent ring 250 may be similar or identical to the first accent ring 50, except for a larger size configured to match the second circle-shaped hole 14 in the vehicle body panel 10. In some embodiments, the third accent ring 250 may be made of a resilient material, such as rubber or a soft plastic. Alternatively or additionally, the third accent ring 250 may include a hard material, such as metal or a hard polymer.

Figure 9A:
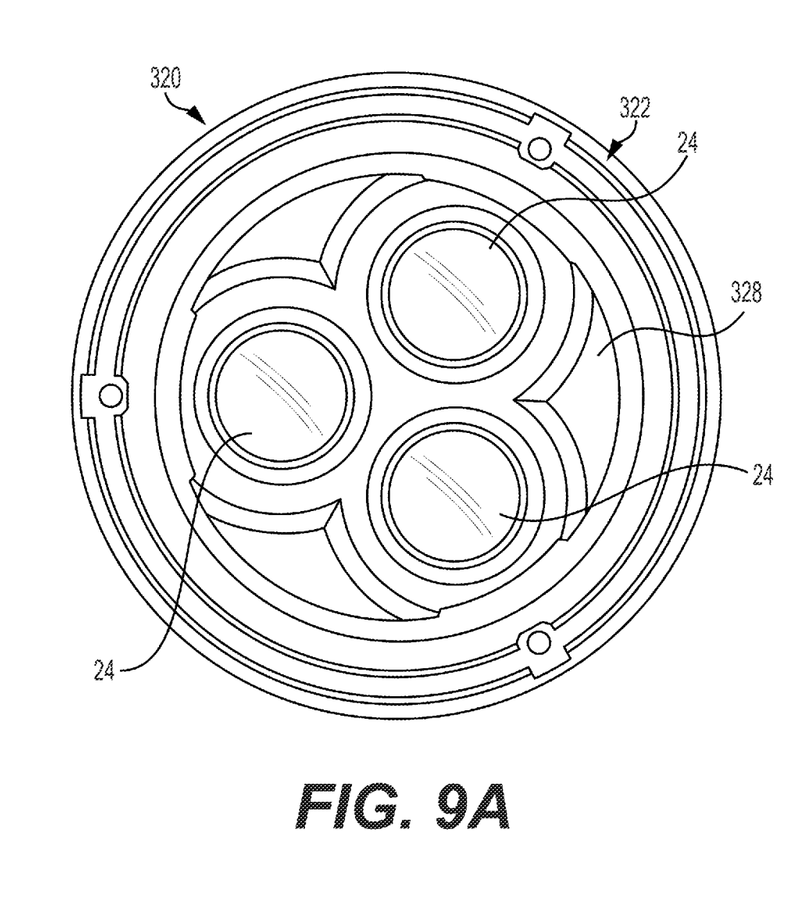
FIG. 9A shows a front view of a sixth lighting assembly of the present disclosure, including a sixth circular lighting insert holding three of the spheroid lenses.
Figure 9B:
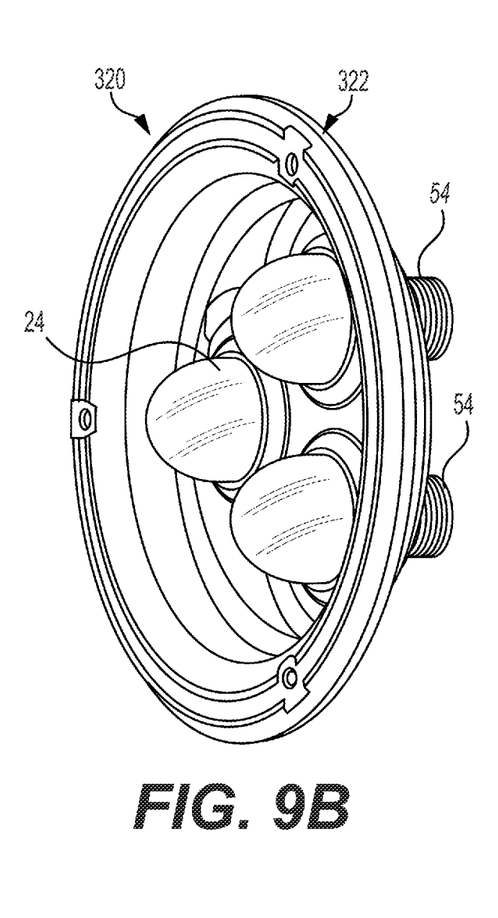
FIG. 9B shows a perspective view of the sixth lighting assembly of FIG. 9A.

FIG. 9A-9B show a sixth lighting assembly 320 including a sixth circular lighting insert 322. The sixth lighting assembly 320 may be similar or identical to the fifth lighting assembly 220, except configured to hold three of the first spheroid lenses 24. The sixth circular lighting insert 322 may allow three of the mini watermelon lights, each having a diameter of about 0.75", to be mounted in the second circle-shaped hole 14, which has much larger diameter, such as 4.0". The sixth circular lighting insert 322 provides a water-tight seal between the first spheroid lenses 24 and the vehicle body panel 10. The sixth circular lighting insert 322 may have a one-piece construction that seals against both the vehicle body panel 10 and the first spheroid lens 24 for providing a water-tight seal therebetween. For example, the sixth circular lighting insert 322 may be made from a cast material, such as a metal billet.

As shown in FIGS. 9A-9B, the sixth circular lighting insert 322 includes a sixth floor 328 having a circular shape with a flat surface that extends parallel to and spaced apart from the vehicle body panel 10. The sixth floor 328 defines three lens apertures (not shown on the FIGs), arranged in an equilateral triangle and each configured to receive a corresponding one of the first spheroid lenses 24 for attachment thereto. The lens apertures may be substantially smaller than the second circle-shaped hole 14 in the vehicle body panel 10. For example, the lens apertures may each have a diameter of about 0.75 inches.

Figure 10A:
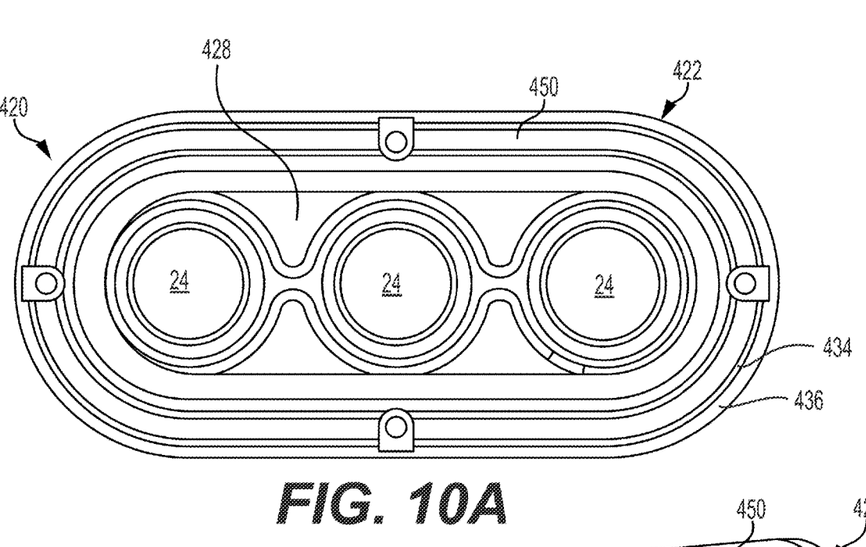
FIG. 10A shows a front view of a seventh lighting assembly of the present disclosure, including an oval lighting insert holding three of the spheroid lenses.
Figure 10B:
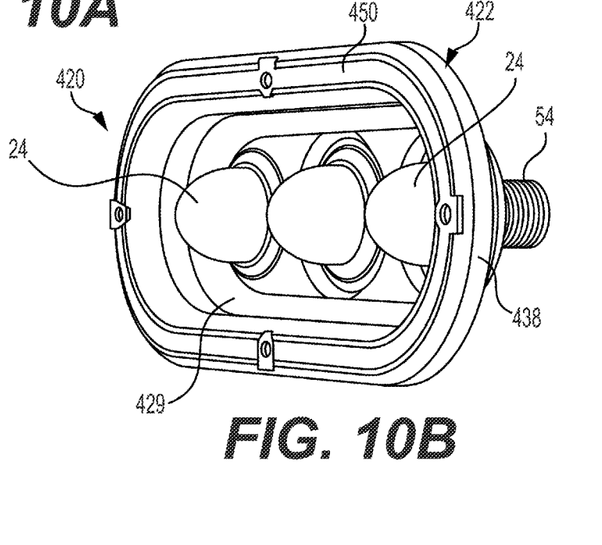
FIG. 10B shows a perspective view of the seventh lighting assembly of FIG. 10A.

FIG. 10A-10B show a seventh lighting assembly 420 of the present disclosure, including an oval-shaped lighting insert 422 that defines an oval shape and which is configured to cover the oval-shaped hole 16 in the vehicle body panel 10 and to provide a water-tight seal between the first spheroid lenses 24 and the vehicle body panel 10. The oval-shaped lighting insert 422 may have a one-piece construction that seals against both the vehicle body panel 10 and the first spheroid lenses 24 for providing a water-tight seal therebetween. For example, the oval-shaped lighting insert 422 may be made from a cast material, such as a metal billet.

The oval-shaped lighting insert 422 may be similar or identical to the first circular lighting insert 22, except with the oval-shape and configured to hold three of the first spheroid lenses 24 in straight-line arrangement. As shown in FIGS. 10A-10B, the oval-shaped lighting insert 422 includes a seventh floor 428 having an oval shape with a flat surface that extends parallel to and spaced apart from the vehicle body panel 10. The seventh floor 428 defines three lens apertures (not shown on the FIGs), arranged in a straight line and each configured to receive a corresponding one of the first spheroid lenses 24 for attachment thereto. The lens apertures may be substantially smaller than the oval-shaped hole 16 in the vehicle body panel 10. For example, the lens apertures may each have a diameter of about 0.75 inches The oval-shaped lighting insert 422 also defines a fourth outer surface 434 that extends parallel to the seventh floor 428 and parallel to the vehicle body panel 10 when the seventh lighting assembly 420 is attached thereto. In some embodiments, and as shown in FIGS. 10A-10B the fourth outer surface 434 defines an oval-shaped recess 440 configured to receive an oval-shaped accent ring 450, which may present a different finish appearance such as a dull finish, which may appear black or another color. The oval-shaped accent ring 450 may be similar or identical to the first accent ring 50, except for the oval shape configured to match the oval-shaped hole 16 in the vehicle body panel 10. In some embodiments, the oval-shaped accent ring 450 may be made of a resilient material, such as rubber or a soft plastic. Alternatively or additionally, the oval-shaped accent ring 450 may include a hard material, such as metal or a hard polymer.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A lighting assembly comprising:
   at least one spheroid lens;
   a lighting insert configured to hold the at least one spheroid lens and to cover a hole in a vehicle body panel, wherein the lighting insert is further configured to form a water-tight seal with each of the vehicle body panel and the at least one spheroid lens, wherein the lighting insert defines an annular recess; and
   an accent ring disposed within the annular recess and defining a plurality of mounting holes for receiving fasteners for attaching the lighting assembly to the vehicle body panel.

2. The lighting assembly of claim 1, wherein the lighting insert defines a circle shape and is configured to cover a circle-shaped hole in the vehicle body panel.

3. The lighting assembly of claim 1, wherein the lighting insert defines an oval shape and is configured to cover an oval-shaped hole in the vehicle body panel.

4. The lighting assembly of claim 1, wherein the lighting insert defines a lens aperture configured to hold a spheroid lens of the at least one spheroid lens, and wherein the lens aperture is substantially smaller than the hole in the vehicle body panel.

5. The lighting assembly of claim 4, further comprising: a mounting base attached to the spheroid lens and configured to extend through the lens aperture; and a retaining nut configured to engage the mounting base for holding the spheroid lens tight against the lighting insert.

6. The lighting assembly of claim 5, wherein the mounting base defines external threads and the retaining nut is configured to screw onto the external threads of the mounting base.

7. The lighting assembly of claim 1, wherein the at least one spheroid lens includes exactly one spheroid lens, and wherein the lighting insert defines a lens aperture configured to hold the one spheroid lens, and wherein the lens aperture is substantially smaller than the hole in the vehicle body panel.

8. The lighting assembly of claim 1, wherein the at least one spheroid lens includes three spheroid lenses, and wherein the lighting insert defines a lens aperture configured to hold each of the three spheroid lenses, and wherein each of the lens apertures is substantially smaller than the hole in the vehicle body panel.

9. The lighting assembly of claim 1, wherein the lighting insert is configured to hold the at least one spheroid lens in an extended position substantially entirely outside of the vehicle body panel.

10. The lighting assembly of claim 1, wherein the lighting insert defines an outer surface spaced apart from the vehicle body panel, and wherein the lighting insert is configured to hold the at least one spheroid lens in a recessed position not protruding beyond the outer surface.

11. The lighting assembly of claim 1, wherein the lighting insert includes a metal billet.

12. The lighting assembly of claim 1, wherein the lighting insert presents a first surface finish, and the accent ring presents a second surface finish that is different than the first surface finish of the lighting insert.

13. The lighting assembly of claim 12, wherein the lighting insert is made of a resilient material.

14. The lighting assembly of claim 12, wherein the first surface finish of the lighting insert presents a bright reflective surface.

15. The lighting assembly of claim 12, wherein the second surface finish of the accent ring presents a non-reflective finish.

* * * * *